United States Patent
Urmanov et al.

(10) Patent No.: US 8,798,944 B2
(45) Date of Patent: Aug. 5, 2014

(54) ESTIMATING BALL-GRID-ARRAY LONGEVITY IN A COMPUTER SYSTEM

(75) Inventors: Aleksey M. Urmanov, San Diego, CA (US); Anton A. Bougaev, La Jolla, CA (US); David K. McElfresh, San Diego, CA (US); Leoncio D. Lopez, Escondido, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1029 days.

(21) Appl. No.: 12/490,012

(22) Filed: Jun. 23, 2009

(65) Prior Publication Data
US 2010/0324882 A1    Dec. 23, 2010

(51) Int. Cl.
*G01F 17/00* (2006.01)
(52) U.S. Cl.
USPC .............................................................. 702/56
(58) Field of Classification Search
CPC .................................................. G06F 11/3089
USPC .............................................................. 702/56
See application file for complete search history.

(56) References Cited

U.S. PATENT DOCUMENTS

| 7,089,138 B1 * | 8/2006 | Bouchard et al. ............. 702/117 |
| 2007/0296068 A1 * | 12/2007 | Schnetker ..................... 257/669 |
| 2008/0255785 A1 * | 10/2008 | Gross et al. ..................... 702/79 |

OTHER PUBLICATIONS

Richard M. Christenson, Failurecriteria, "IV. Cumulative Damage Leading to Fatigue and Creep Failure for General Materials", Oct. 18, 2008.*

* cited by examiner

*Primary Examiner* — Stephen Cherry
(74) *Attorney, Agent, or Firm* — Park, Vaughan, Fleming & Dowler LLP; Steven E. Stupp

(57) ABSTRACT

A method for generating a service action for a computer system is described. During the method, a longevity index value for a packaging technology in the computer system is calculated using a longevity model and thermal and vibration telemetry data that is collected in the computer system. This longevity model may be based on accelerated failure testing of the packaging technology, field failures of the packaging technology in a group of computer systems that includes the computer system, and/or thermal and vibration telemetry data for the group of computer systems. Furthermore, using the longevity index value, the service action for the computer system is determined. Based on the longevity index value, remedial as action, e.g., repairs to the computer system, may be scheduled and performed.

21 Claims, 6 Drawing Sheets

ESTIMATING BALL-GRID-ARRAY LONGEVITY IN A COMPUTER SYSTEM

BACKGROUND

1. Field

The present disclosure relates to techniques for estimating solder-joint longevity. More specifically, the present disclosure relates to techniques for estimating the reliability of solder joints in a ball grid array (BGA) in a computer system.

2. Related Art

Solder joints are widely used in computer systems as interconnects between components, such as: microprocessors, integrated circuits, application specific integrated circuits (ASICs), field programmable gate arrays (FPGAs), and/or printed circuits. However, because of varying thermal and vibration conditions in computer systems, these solder joint interconnects can fail during operation of these components. For example, because of phenomena (such as different coefficients of thermal expansion and fatigue) varying thermal and vibration conditions can result in interconnect failures in BGAs, such as: interfacial joint fractures, bulk solder-joint fractures, metal pad lift, etc.

Interconnect failures can cause intermittent or permanent system faults and failures, thereby interrupting system operation. Furthermore, intermittent system faults are among the main causes of no-trouble-found (NTF) events, in which a customer returns a computer for repair but the manufacturer is unable to determine the source of the problem. NTF events are expensive, difficult to root cause, and strain relationships between manufacturers and customers.

Consequently, dynamic estimates (as a function of time) of the longevity of solder joints in individual systems, as well as in groups of systems, are a fundamental aspect of reliability prediction. To facilitate such longevity estimates, dedicated canary devices (i.e., allocating solder joints for use as canary devices) are often included in BGAs. However, additional circuits in ASICs or FPGAs are often needed to monitor such canary devices. Furthermore, in order to continuously monitor the integrity of a BGA, the canary devices can consume a sizeable fraction of the solder joints.

In addition, false and missed alarms can occur if the solder-joint longevity estimate is determined based solely on information obtained from canary devices. This is because of the stochastic nature of the signals monitored. In particular, even though canary solder joints are supposed to be under more stress and fail earlier than the non-canary solder joints, there are typically fewer canary solder joints than non-canary solder joints. For example, a first failure of canary solder joint may represent a 1% cumulative failure rate while the first failure of a non-canary solder joints may represent a 0.1% or less cumulative failure rate because the number of non-canary solder joints is typically more than ten times the number of canary solder joints. Therefore, it is likely that at least one of the non-canary solder joints that is not being monitored will fail before a canary solder joint.

Hence, what is needed is a technique for monitoring and estimating the longevity of solder joints without the above-described problems.

SUMMARY

One embodiment of the present disclosure provides a computer system in a group of computer systems that generates a service action for itself. During operation, the computer system provides telemetry data corresponding to thermal stress and vibration in the computer system. For example, the thermal stress may be the cumulative thermal stress, and the vibration may be the cumulative vibration. Then, the computer system receives a current longevity model for a packaging technology used in the group of computer systems. This current longevity model provides a longevity index value for the packaging technology in a given computer system (such as the computer system) in the group of computer systems based at least on the thermal stress and the vibration in the given computer system. Using the current longevity model and the thermal stress and the vibration in the computer system, the computer system determines a longevity index value for the packaging technology in the computer system. Next, the computer system generates the service action based at least on the longevity index value.

Note that the telemetry data may be collected during operation of the computer system. For example, the telemetry data may include measurements performed by physical sensors in the computer system and/or performance metrics determined by software (i.e., virtual sensors) in the computer system.

In some embodiments, the packaging technology includes solder joints in a ball grid array (BGA). Furthermore, the telemetry data may include state signals (such as voltage, current and/or impedance measurements) from canary devices embedded in a BGA.

Additionally, the current longevity model may be based at least on accelerated failure testing of the packaging technology, field failures of the packaging technology in the group of computer systems and/or telemetry data for the computer system and other computer systems in the group of computer systems. This accelerated failure testing of the packaging technology may include vibration and thermal testing.

Note that generating the service action may involve comparing the longevity index value to one or more thresholds. For example, if the longevity index value is greater than a first threshold value in the one or more threshold values, the service action may indicate that a probability of failure in the packaging technology in the computer system is low. Alternatively, if the longevity index value is between the first threshold value and a second threshold value in the one or more threshold values, the service action may indicate that a probability of failure in the packaging technology in the computer system is moderate. Additionally, if the longevity index value is less than the second threshold value, the service action may indicate that a probability of failure in the packaging technology in the computer system is high.

In some embodiments, the computer system provides the service action via a network.

Another embodiment provides a method including at least some of the above-described operations.

Another embodiment provides a computer-program product that facilitates the above-described operations on the system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a system, a method for generating a service action for the computer system, and a computer-program product (i.e., software) for use in the computer system are described. During the method, a longevity index value for a packaging technology (such as solder joints in a BGA) in the computer system is calculated using thermal and vibration telemetry data (which is collected in the computer system) and a longevity model. This longevity model may be based on: accelerated failure testing of the packaging technology, field failures of the packaging technology in a group of computer systems (which includes the computer system), thermal and vibration telemetry data for the group of computer systems, and/or (more generally) one or more additional inferential variables for longevity of the packaging technology. Furthermore, using the longevity index value, the service action for the computer system is determined. Based on the longevity index value, remedial action (such as repairs to the computer system) may be scheduled and performed.

By determining the longevity index value using multiple sources of information, including a priori information (such as the accelerated failure testing of the packaging technology) and a posteriori information (the field failures of the packaging technology in the group of computer systems and/or thermal and vibration telemetry data for the group of computer systems), this monitoring technique provides more robust and reliable estimates of the longevity of the packaging technology. This, in turn, allows corrective remedial action to be performed, when needed, on particular computer systems in the group of computer systems. Therefore, the monitoring technique reduces NTF events and field failures, thereby increasing reliability, availability and serviceability, reducing manufacturer and customer expense and aggravation, and increasing customer satisfaction.

In the discussion that follows, a BGA with multiple solder joints is used as an illustrative example of the packaging technology. However, the monitoring technique may be used with a wide variety of packaging and interconnect technologies.

Figure 1:
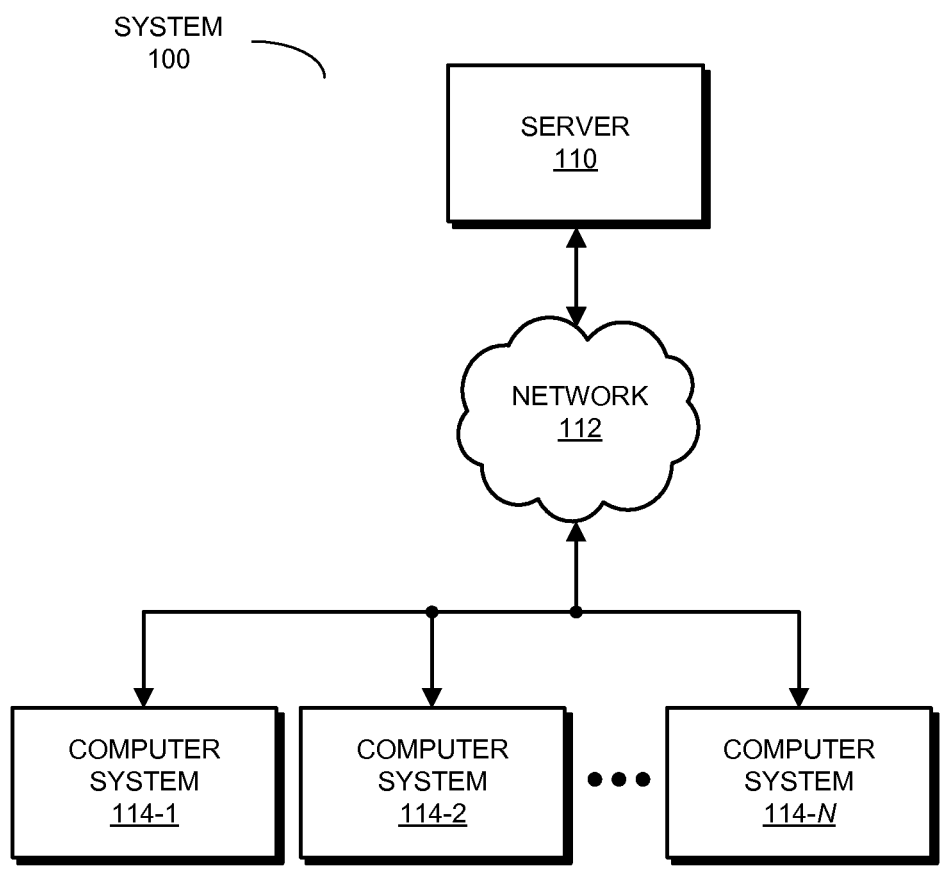
FIG. 1 is a block diagram illustrating a system in accordance with an embodiment of the present disclosure.

We now describe embodiments of a system. FIG. 1 presents a block diagram illustrating a system 100. In this system, computer systems 114, which may be the same type or model of computer system, include interconnects with BGAs, which each include multiple solder joints. Note that in some embodiments, the BGAs include canary devices (such as canary solder joints). However, in other embodiments the BGAs do not include canary devices, as is the case in many legacy computer systems.

Each of computer systems 114 may include real-time continuous monitoring of telemetry data, such as a continuous system telemetry harness or CSTH (which is described further below with reference to FIG. 2). For example, each of computer systems 114 may include physical sensors that measure physical variables, such as: embedded accelerometers on circuit boards or in integrated circuits that measure vibration levels; thermal sensors (e.g., thermocouples or ring oscillators) that measure temperature in computer systems 114; and/or canary devices and related circuits that measure state signals associated with the integrity of solder joints (e.g., currents or voltages corresponding to solder-joint resistance). Furthermore, software monitors (i.e., virtual sensors) in each of computer systems 114 may determine or infer additional metrics, such as performance metrics of computer systems 114.

In general, the telemetry data may provide information about the operating environment for the BGAs in computer systems 114, such as: power cycling (including the periodicity and the cumulative number of power cycles), temperature cycling (including the periodicity and the cumulative number of temperature cycles), thermal gradients, and/or vibration data.

Note that the continuous monitoring of BGA solder-joint longevity may be non-intrusive. Moreover, the telemetry data may be collected during operation of computer systems 114.

Initially, a given computer system in computer systems 114 may estimate longevity of its BGAs using an a priori longevity model that predicts longevity of the BGAs as a function of thermal stress (or damage) and vibration stress (or damage), which can be determined using the telemetry data from the given computer system. For example, the thermal stress may be the cumulative thermal stress, and the vibration may be the cumulative vibration. This a priori longevity model may be based at least on accelerated vibration and thermal testing data of one or more BGAs that was previously gathered by a manufacturer of computer systems 114 and/or a manufacturer of components that include the BGAs.

In addition, the telemetry data may be reported to server 110 via network 112. Server 110 may use the telemetry data from computer systems 114 in conjunction with the a priori longevity model and/or field failure data of the BGAs in computer systems 114 to determine a current longevity model for the BGAs in computer systems 114. This current a posteriori longevity model may provide improved estimates of the longevity of the BGAs as a function of cumulative thermal stress and cumulative vibration stress in a given computer system. Note that server 110 may update the a posteriori longevity model (i.e., may determine the current a posteriori longevity model) continuously, periodically and/or as needed (for example, when additional field failures occur and/or when additional telemetry data is received).

Server 110 may provide the current a posteriori longevity model to computer systems 114 via network 112. Each of computer systems 114 may use the current a posteriori longevity model to estimate longevity of their BGAs. In particular, a given computer system (such as computer system 114-1) may calculate a longevity index value for one or more BGAs in the given computer system using the current a posteriori longevity model and cumulative thermal stress and cumulative vibration stress, which have been measured (or computed) in the given computer system using the CSTH.

Then, the given computer system may determine a service action for the given computer system based at least on the calculated longevity index value. For example, the given computer system may compare the longevity index value to one or more thresholds. In some embodiments, the longevity index value may be binned to have one of three possible values. 'Green' (when the longevity index value exceeds a first threshold) indicates that the BGAs in a given computer system are healthy, with a low probability of failure; 'yellow' (when the longevity index value is less than a first threshold and greater than a second threshold) indicates that the BGAs in the given computer system are marginal (i.e., the longevity is sub-optimal), with a moderate probability of failure; and 'red' (when the longevity index value is less than the second threshold) indicates that the BGAs in the given computer system are unreliable, with a high probability of failure.

Furthermore, the given computer system may provide the service action to server 110 via network 112. If the service action indicates that the longevity of one or more BGAs in the given computer system is unacceptable (e.g. that a failure is imminent or that the estimated operating life of the one or more BGAs is less than the projected life of the given computer system), server 110 may schedule remedial action (such as repair of the given computer system or system shutdown), thereby preventing intermittent glitches and possible system crashes due to solder-joint failures. Thus, by incorporating multiple sources of information, the current a posteriori longevity model may improve the quality of longevity estimates (i.e., the longevity index values) and the reliability, availability and serviceability of computer systems 114 (such as multi-processor servers) in which components are interconnected by BGAs.

Figure 2:
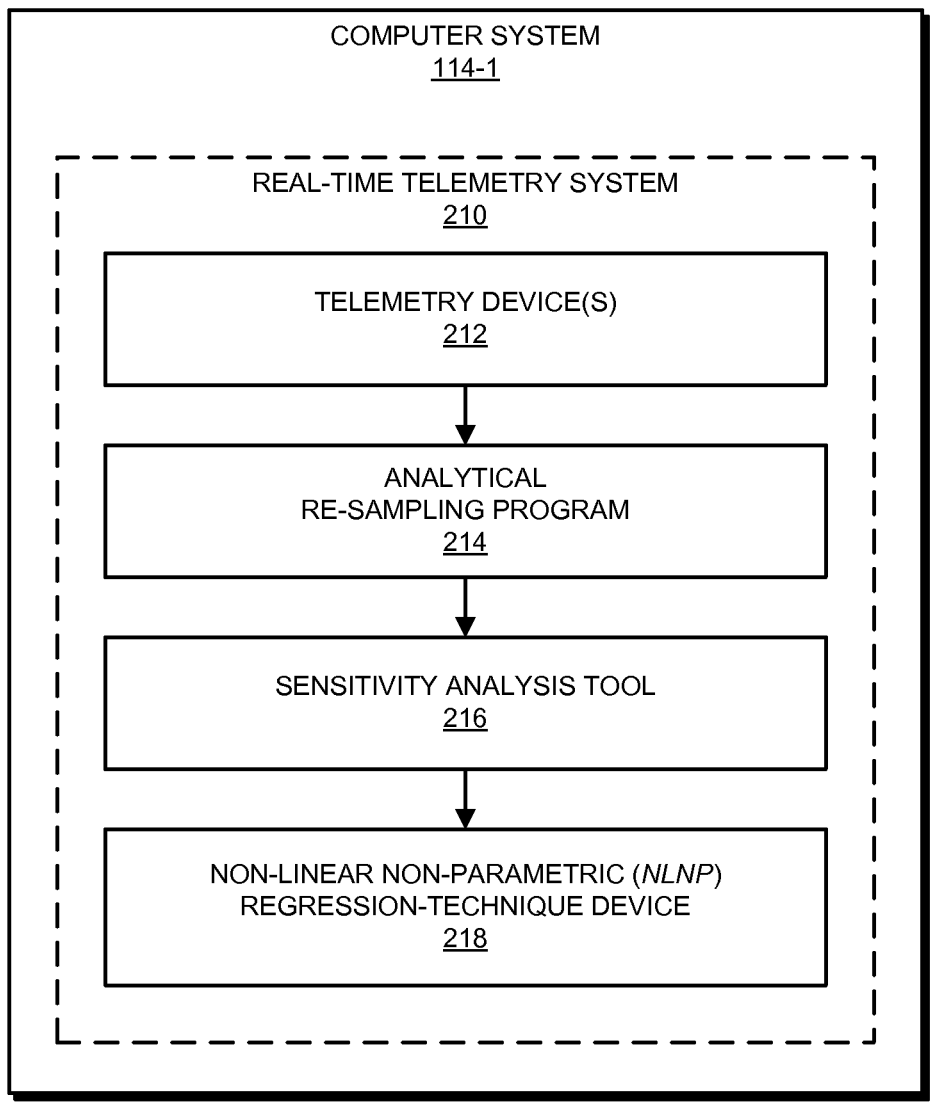
FIG. 2 is a block diagram illustrating a real-time telemetry system for use in the computer systems in FIG. 1 in accordance with an embodiment of the present invention.

FIG. 2 presents a block diagram illustrating a real-time telemetry system 210 for use in each of computer systems 114 (FIG. 1), such as computer system 114-1. This real-time telemetry system includes: telemetry device 212, analytical re-sampling program 214, sensitivity analysis tool 216, and/or non-linear, non-parametric (NLNP) regression-technique device 218.

Telemetry device 212 gathers information (such as temperature and vibration data, and more generally, telemetry data) from various physical sensors and monitoring tools within computer system 114-1 in real-time during operation of computer system 114-1. In some embodiments, measurements are performed: as needed, continuously, or when driven by an event (such as an interrupt). Note that the information gathered can include telemetry signals or data associated with internal performance parameters or metrics maintained by software within computer system 114-1. For example, these internal performance metrics can include: system throughput, transaction latencies, queue lengths, load on one or more processors or processor cores, load on the memory, load on the cache, I/O traffic, bus saturation metrics, FIFO overflow statistics, and/or various operational profiles gathered through 'virtual sensors' located within the operating system.

Moreover, the information can include telemetry signals or data associated with test performance parameters for synthetic user transactions, which may be periodically generated for the purpose of measuring quality of service from the end user's perspective. Additionally, the information may include hardware or physical variables, including, but not limited to: distributed internal temperatures, environmental variables (such as relative humidity, cumulative or differential vibrations within computer system 114-1, fan speed, acoustic signals, current noise, voltage noise, and/or time-domain reflectometry readings), and/or energy consumption (such as currents and voltages).

Then, real-time telemetry system 210 directs the telemetry signals or data to local or remote locations that contain analytical re-sampling program 214, sensitivity analysis tool 216, and NLNP regression-technique device 218. In some embodiments, analytical re-sampling program 214, sensitivity analysis tool 216, and NLNP regression-technique device 218 are located within computer system 114-1. However, in other embodiments analytical re-sampling program 214, sensitivity analysis tool 216, and NLNP regression-technique device 218 are located on a plurality of computer systems including computer system 114-1 and/or other remote computer systems.

Note that analytical re-sampling program 214 ensures that the telemetry data have a uniform sampling rate. In doing so, analytical re-sampling program 214 may use interpolation techniques, if necessary, to fill in missing data points, or to equalize the sampling intervals when the raw data is non-uniformly sampled.

After the telemetry data pass through analytical re-sampling program 214, they may be aligned and correlated by sensitivity analysis tool 216. For example, in some embodiments sensitivity analysis tool 216 uses a moving window technique that 'slides' through the telemetry data with systematically varying window widths. These sliding windows systematically vary the alignment between windows for different telemetry data to optimize the degree of association between the telemetry data, as quantified by an 'F-statistic,' which is computed and ranked for all telemetry data windows by sensitivity analysis tool 216.

When statistically comparing the quality of two fits, F-statistics reveal the measure of regression. In particular, the higher the value of the F-statistic, the better the correlation is between two telemetry signals. In some embodiments, the lead/lag value for the sliding window that results in the F-statistic with the highest value is chosen, and the candidate telemetry signal is aligned to maximize this value. This process may be repeated for each telemetry signal by sensitivity analysis tool 216.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Because these two telemetry signals are perfectly correlated, one does not contain any additional information over the other, and therefore, one may be discarded.

Moreover, some telemetry signals may exhibit little correlation, or no correlation whatsoever. In this case, these telemetry signals may be dropped as they add little predictive value. Once a highly correlated subset of the telemetry signals has been determined, they may be combined into one group or cluster for processing by the NLNP regression-technique device 218. In particular, as described further below, NLNP regression-technique device 218 may determine one or more inferential models based on this subset of the telemetry signals, such as inferential models that associate cumulative thermal and vibration stress in computer system 114-1 with a longevity index value of one or more BGAs in computer system 114-1. Note that the one or more inferential models may be determined during a training mode and/or in real time as the telemetry data is collected.

Figure 3:
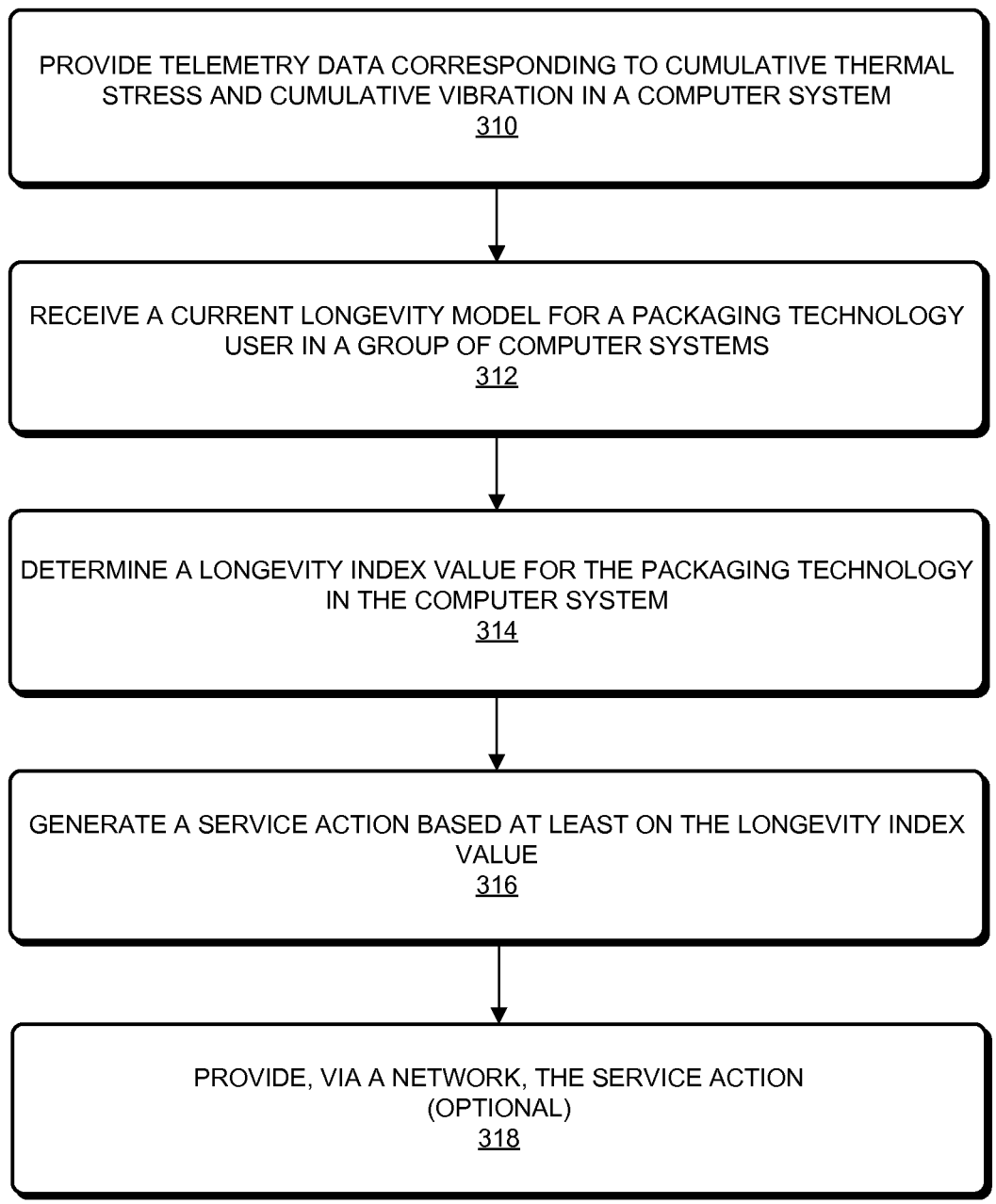
FIG. 3 is a flow chart illustrating a process for generating a service action for a computer system in the computer systems in the system of FIG. 1 in accordance with an embodiment of the present disclosure.

We now describe embodiments of a process for monitoring computer systems 114 (FIG. 1). FIG. 3 presents a flow chart illustrating a process 300 for generating a service action for a computer system (such as computer system 114-1 in FIG. 1) in a group of computer systems in system 100 (FIG. 1), which may be performed by the computer system (e.g., the computer system may generate a service action for itself). During operation, the computer system provides telemetry data corresponding to cumulative thermal stress and cumulative vibration in the computer system (operation 310). For example, the computer system may provide telemetry data corresponding to BGAs in the computer system. Then, the computer system receives a current longevity model for a packaging technology used in the group of computer systems (operation 312). This current longevity model provides a longevity index value for the packaging technology in a given computer system (such as the computer system) in the group of computer systems based at least on the cumulative thermal stress and the cumulative vibration in the given computer system.

Using the current longevity model and the cumulative thermal stress and the cumulative vibration in the computer system, the computer system determines a longevity index value for the packaging technology in the computer system (operation 314). Next, the computer system generates the service action based at least on the longevity index value (operation 316).

In some embodiments, the computer system optionally provides, via a network, the service action (operation 318).

In some embodiments of process 300, there may be additional or fewer operations. For example, the current longevity model may be dynamically adapted after it is received (such as tuning the current longevity model to a particular computer system where it is used). Moreover, the order of the operations may be changed and/or two or more operations may be combined into a single operation.

In an exemplary embodiment, a priori vibration and thermal accelerated testing is performed to generate computer-system specific data, such as data for a particular model or type of computer system. This accelerated testing data may be used to build an a priori model that relates the longevity of BGA solder joints to the cumulative vibration and thermal damage during the accelerated testing. For example, the BGA solder-joint longevity may be the duration of operation of a BGA without solder-joint failures. Thus, Longevity($t$)=Longevity(thermal damage($t$),vibration damage($t$)), i.e., in the a priori model of longevity as a function of time, the longevity corresponds to or is a function of the cumulative thermal damage and the cumulative vibration damage during the accelerated testing Moreover, computer systems in the field may be monitored continuously using CSTHs, which poll (on a periodic basis) physical sensors and system performance metrics, such as: temperatures, voltages, currents, fan speeds, vibration levels from embedded accelerometers, power-cycling counters, power-on hours, processor and memory utilization, input/output (I/O) activities, etc. This system telemetry data may be used to estimate the cumulative thermal and vibration damage. For example, Thermal damage($t$)=thermal damage(telemetry data, power-on hours,power cycles,operating loads), i.e., the thermal damage as a function of time may correspond to the system telemetry data, the power-on hours, the power cycles and/or the operating loads. Similarly, Vibration damage($t$)=vibration damage(telemetry data,accelerometer measurements), i.e., the vibration damage as a function of time may correspond to the system telemetry data and acceleration measured using embedded accelerometers.

Note that the a priori longevity model may be determined by performing pattern-recognition analysis on a time-series of thermal damage and vibration data using an NLNP regression technique, such as a R-functions and/or a kernel regression model. For example, in the a priori longevity model, the longevity index value may equal a first coefficient times thermal damage(t) plus a second coefficient times vibration damage(t). Alternatively, in the a priori longevity model, the longevity index value may be $$KNs^b,$$

where K is a constant, N is the number of stress cycles (thermal and/or vibrational), s is the stress cycle amplitude and b is a stress exponent which is consistent with a material fatigue curve.

Note that R-functions are described in U.S. Pat. No. 7,478,075, entitled "Reducing the size of a training set for classification," by Aleksey M. Urmanov et al., and United States Patent Application No. 2007/0244843, entitled "Method and apparatus for classifying data using R-functions," by Anton A. Bougaev et al., the contents of both of which are herein incorporated by reference. More generally, a wide variety of supervised learning techniques may be used in the monitoring technique.

Field failure data and the a priori model may be used to compute the a posteriori model, which relates the longevity of BGA solder joints to the cumulative vibration and thermal damage taking into account the field failure data. In particular, Longevity|Data=$G$(field failure data,a priori longevity model), where G( ) denotes the a posteriori model longevity estimation mechanism. For example, the a posteriori model may perform pattern-recognition analysis on the telemetry data, the field failure data and/or the a priori model (or the accelerated testing data) using an NLNP regression technique, such as the R-functions and/or a kernel regression model.

In some embodiments, longevity index values are determined remotely, for example, at each of computer systems 114 (FIG. 1), as described in process 300 (FIG. 3). Alternatively or additionally, in some embodiments, a central computer (such as in server 110 in FIG. 1), receives field failure data and system telemetry data. This central computer may compute one or more a posteriori models, and may determine longevity index values for BGA solder joints in computer systems 114 (FIG. 1).

Figure 4:
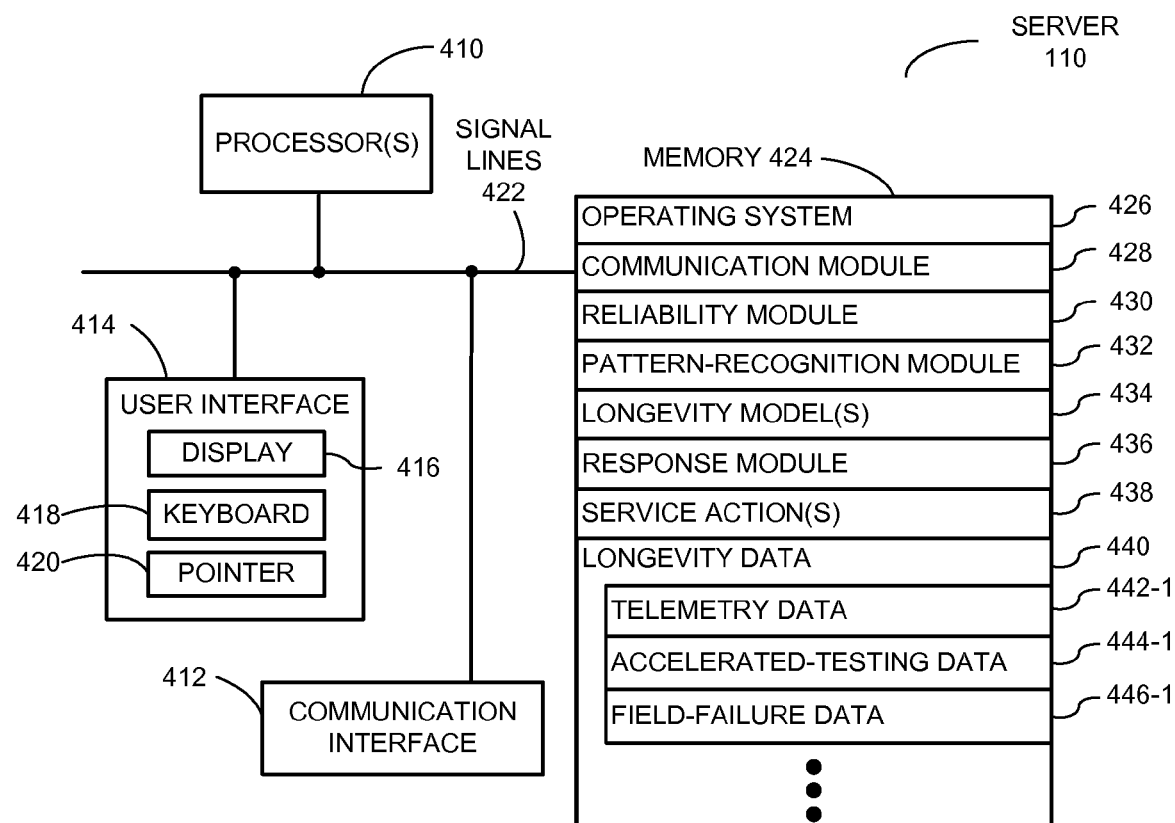
FIG. 4 is a block diagram illustrating a server in the system of FIG. 1 in accordance with an embodiment of the present disclosure.

We now describe embodiments of server 110 (FIG. 1) and computer systems 114 (FIG. 1). FIG. 4 presents a block diagram illustrating a server 110 in system 100 (FIG. 1). Server 110 includes: one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in server 110 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to server 110.

Memory 424 may also include one or more program modules (or sets of instructions), including: reliability module 430 (or a set of instructions), pattern-recognition module 432 (or a set of instructions), and/or response module 436 (or a set of instructions). Note that one or more of program modules may constitute a computer-program mechanism.

Reliability module 430 may determine one or more longevity models 434 using pattern-recognition module 432 and longevity data 440. Note that longevity data 440 may include: telemetry data 442-1 received from one or more computer systems via communication module 428; accelerated testing data 444-1 (such as accelerated thermal and vibration test data); and/or field failure data 446-1. Server 110 may provide a current longevity model in the one or more longevity models 434 to the one or more computer systems using communication module 428.

Subsequently, server 110 may receive one or more service actions 438 from the one or more computer systems using communication module 428. Response module 436 may process these service actions to determine appropriate remedial action(s) for the one or more computer systems.

Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processors (or processor cores) 410.

Figure 5:
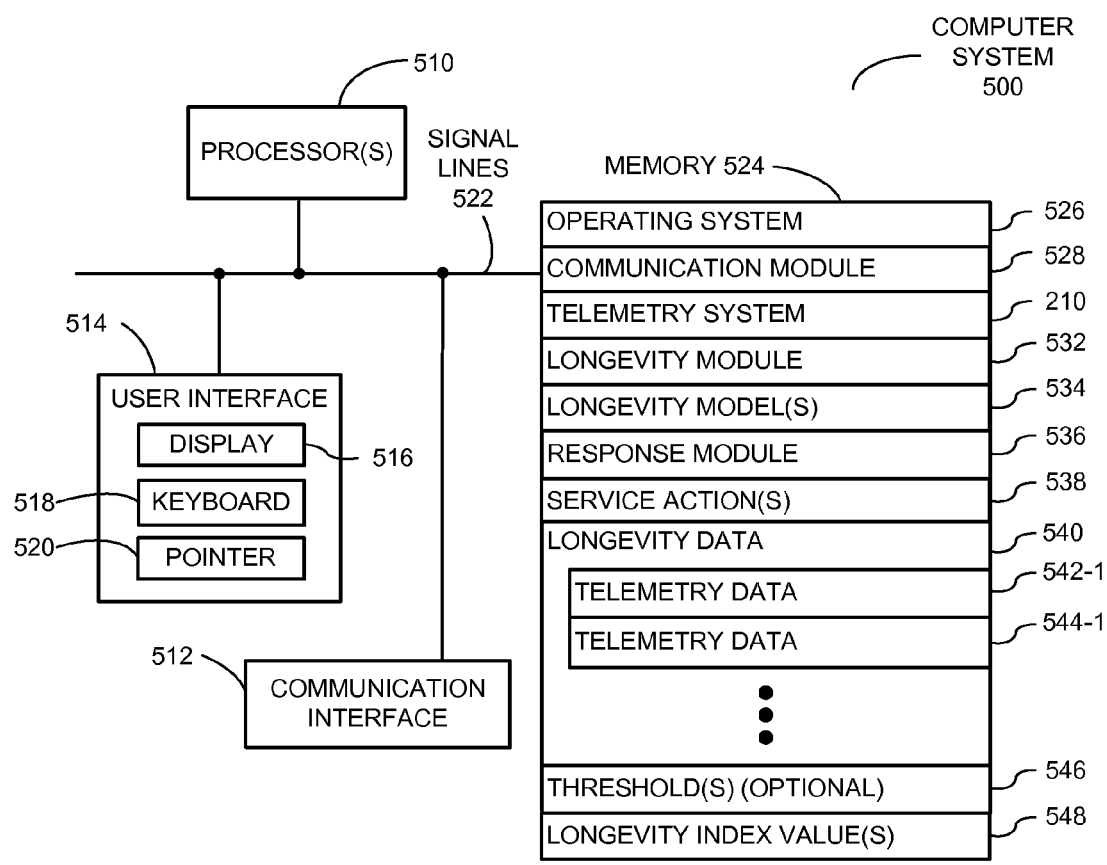
FIG. 5 is a block diagram illustrating a computer system that performs the process of FIG. 3 in accordance with an embodiment of the present disclosure.

FIG. 5 presents a block diagram illustrating a computer system 500 (such as one of computer systems 114 in FIG. 1) that performs process 300 (FIG. 3). Computer system 500 includes: one or more processors (or processor cores) 510, a communication interface 512, a user interface 514, and one or more signal lines 522 coupling these components together. Note that the one or more processors (or processor cores) 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash, one or more smart cards, one or more magnetic disc storage devices, and/or one or more optical storage devices. Memory 524 may store an operating system 526 that includes procedures (or a set of instructions) for handling various basic system services for performing hardware-dependent tasks. Moreover, memory 524 may also store communications procedures (or a set of instructions) in a communication module 528. These communication procedures may be used for communicating with one or more computers, devices and/or servers, including computers, devices and/or servers that are remotely located with respect to computer system 500.

Memory 524 may also include one or more program modules (or sets of instructions), including: telemetry system 210 (or a set of instructions), longevity module 532 (or a set of instructions), and/or response module 536 (or a set of instructions). Note that one or more of program modules may constitute a computer-program mechanism.

Telemetry system 210 may measure, collect or infer longevity data 540, such as telemetry data 542-1 and telemetry data 544-1 at different times. Furthermore, computer system 500 may receive a current longevity model in one or more longevity models 534 from server 110 (FIGS. 1 and 4) using communication module 528.

Longevity module 532 may determine cumulative vibration and thermal stress from longevity data 540. Then, longevity module 532 may determine one or more longevity index values 548 using the current longevity model and the cumulative vibration and thermal stress.

Next, response module 536 may compute one or more service actions 538 for computer system 500, which may be communicated to server 110 (FIGS. 1 and 4) using communication module 528. For example, response module 536 may compute the one or more service actions 538 by comparing the one or more longevity index values 548 with one or more optional thresholds 546.

Instructions in the various modules in the memory 524 may be implemented in: a high-level procedural language, an object-oriented programming language, and/or in an assembly or machine language. The programming language may be compiled or interpreted, i.e., configurable or configured, to be executed by the one or more processors (or processor cores) 510.

Computer system 500 may include, but is not limited to: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Note that server 400 (FIGS. 1 and 4) and/or computer system 500 may be at one location or may be distributed over multiple, geographically dispersed locations. Furthermore, network 112 (FIG. 1) may include: the Internet, World Wide Web (WWW), an intranet, LAN, WAN, MAN, or a combination of networks, or other technology enabling communication between computing systems.

System 100 (FIG. 1), server 110 (FIGS. 1 and 4) and/or computer system 500 may include fewer components or additional components. Although these circuits and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of server 110 (FIGS. 1 and 4) and computer system 500 may be implemented in one or more ASICs, FPGAs and/or one or more digital signal processors (DSPs). Furthermore, functionality in system 100 (FIG. 1), server 110 (FIGS. 1 and 4) and/or computer system 500 may be implemented more in hardware and less in software, or less in hardware and more in software, as is known in the art.

Figure 6:
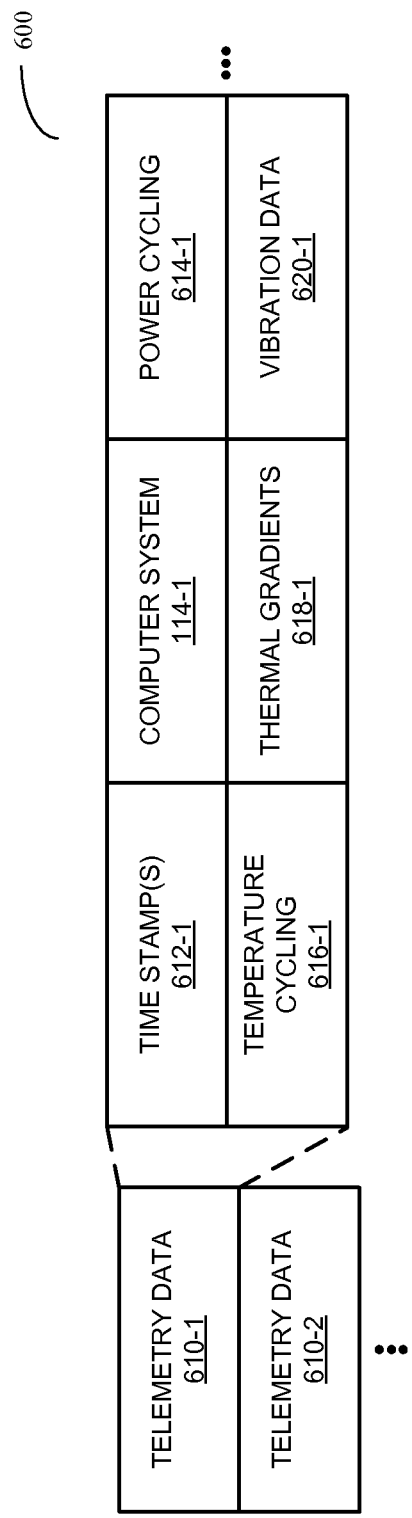
FIG. 6 is a block diagram illustrating a data structure for use in the server of FIG. 4 and/or the computer system of FIG. 5 in accordance with an embodiment of the present invention.

We now describe embodiments of data structures that may be used in server 110 (FIGS. 1 and 4) and/or computer system 500. FIG. 6 presents a block diagram illustrating a data structure 600 for use in server 110 (FIGS. 1 and 4) and/or computer system 500 (FIG. 5). This data structure may include telemetry data 610. More specifically, a given instance of the telemetry data 610 (such as telemetry data 610-1) may include: one or more time stamps 612, an identifier for computer system 114-1 in which telemetry data 610-1 was determined or measured, power cycling 614-1 data, temperature cycling 616-1 data, thermal gradients 618-1 in computer system 114-1, and/or vibration data 620-1. Note that power cycling 614-1 data is pertinent to the normal operation of a computer system.

Figure 7:
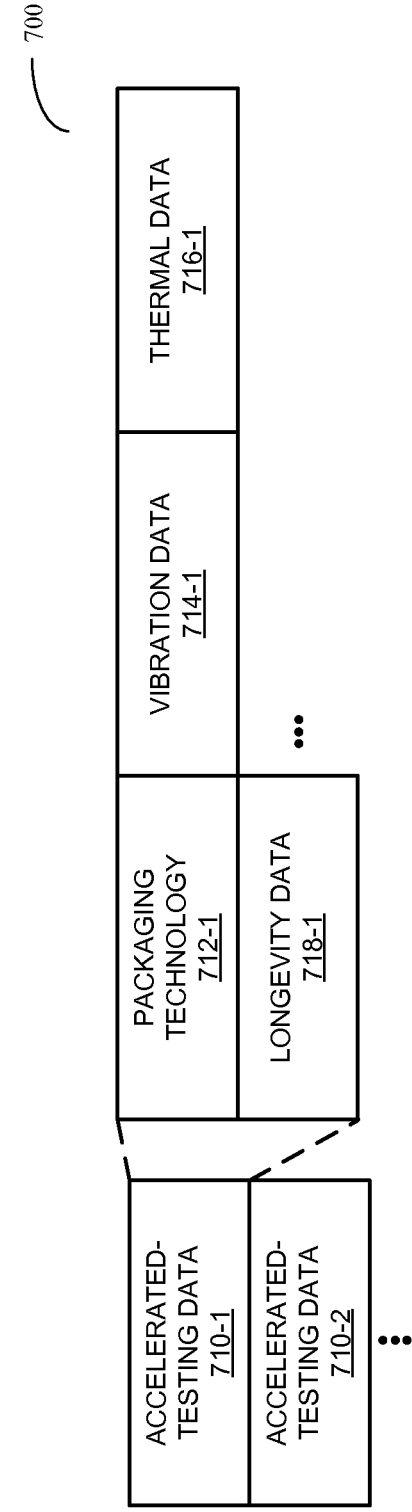
FIG. 7 is a block diagram illustrating a data structure for use in the server of FIG. 4 in accordance with an embodiment of the present invention.

FIG. 7 presents a block diagram illustrating a data structure 700 for use in server 110 (FIGS. 1 and 4). This data structure may include accelerated testing data 710. More specifically, a given instance of the accelerated testing data 710 (such as accelerated testing data 710-1) may include: an identifier for a particular packaging technology 712-1, vibration data 714-1, thermal data 716-1, and/or longevity data 718-1 (such as failures during accelerated failure testing of packaging technology 712-1 and/or field failures of packaging technology 712-1 in a group of computer systems). For example, the data on failures during accelerated failure testing may include component failures in particular computer systems, and the cumulative thermal and/or vibration stress when these components failed. Similarly, the field-failure data may include component failures in particular computer systems, and the cumulative thermal and/or vibration stress in these particular computer when the field failures occurred.

Note that in some embodiments of the data structures 600 (FIG. 6) and/or 700 there may be fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for generating a service action for a computer system in a group of computer systems, comprising:
in at least one computer, performing operations for:
receiving telemetry data for the computer system that is collected during operation of the computer system, wherein the telemetry data includes temperature measurements and vibration level measurements in the computer system;
receiving a first longevity model that predicts longevity of a packaging technology used in the group of computer systems, wherein the first longevity model is based on vibration and thermal testing data for the packaging technology that was collected before the operation of the computer system;
determining a current longevity model for the packaging technology based on the first longevity model and the telemetry data;
using the current longevity model and the telemetry data to calculate a current longevity index value for the computer system, wherein the current longevity index value provides an estimate for the longevity of the packaging technology used in the computer system; and
using the current longevity index value to cause the service action for the computer system to be generated.

2. The method of claim 1, wherein the telemetry data includes measurements performed by physical sensors in the computer system.

3. The method of claim 1, wherein the telemetry data includes performance metrics determined by software in the computer system.

4. The method of claim 1, wherein the packaging technology includes a ball grid array (BGA).

5. The method of claim 1, wherein the current longevity model is based at least on accelerated failure testing of the packaging technology, field failures of the packaging technology in the group of computer systems and telemetry data for the computer system and other computer systems in the group of computer systems.

6. The method of claim 5, wherein the accelerated failure testing of the packaging technology includes vibration and thermal testing.

7. The method of claim 1, wherein generating the service action involves comparing the longevity index values to one or more thresholds;
wherein, if the longevity index value is greater than a first threshold value in the one or more threshold values, the service action indicates that a probability of failure in the packaging technology in the computer system is low;
wherein, if the longevity index value is between the first threshold value and a second threshold value in the one or more threshold values, the service action indicates that a probability of failure in the packaging technology in the computer system is moderate; and
wherein, if the longevity index value is less than the second threshold value, the service action indicates that a probability of failure in the packaging technology in the computer system is high.

8. The method of claim 1, further comprising providing the service action via a network.

9. The method of claim 1, wherein the telemetry data include state signals from canary devices embedded in a BGA.

10. The method of claim 1, wherein the values comprise a value for a measurement of the thermal stress that is measured while the computer system is operating and a value for a measurement of the vibration that is measured while the computer system is operating.

11. The method of claim 1, wherein the data collected before the operation of the computer system comprises past data for the thermal stress and the vibration for the given computer system, wherein the past data was collected before the computer system was ever operated.

12. The method of claim 11, wherein the packaging technology is used in the computer system, and wherein the past data comprises accelerated failure testing data and field failure data.

13. The method of claim 1, further comprising receiving the telemetry data by polling system performance metrics for the computer system, wherein the system performance metrics comprise at least one of power-cycling counters and power-on hours.

14. A computer-program product for use in conjunction with a computer system, the computer-program product comprising a non-transitory computer-readable storage medium and a computer-program mechanism embedded therein for generating a service action for the computer system, which is in a group of computer systems, the computer-program mechanism including:
instructions for receiving telemetry data for the computer system that is collected during operation of the computer system, wherein the telemetry data includes thermal measurements and vibration level measurements in the computer system;

instructions for receiving a first longevity model that predicts longevity of a packaging technology used in the group of computer systems, wherein the first longevity model is based on vibration and thermal testing data for the packaging technology that was collected before the operation of the computer system;

instructions for determining a current longevity model for the packaging technology based on the first longevity model and the telemetry data;

instructions for using the current longevity model and the telemetry data to calculate a current longevity index value for the computer system, wherein the current longevity index value provides an estimate for the longevity of the packaging technology used in the computer system; and instructions for using the current longevity index value to cause the service action for the computer system to be generated.

15. The computer-program product of claim 14, wherein the telemetry data includes performance metrics determined by software in the computer system.

16. The computer-program product of claim 14, wherein the packaging technology includes a ball grid array (BGA).

17. The computer-program product of claim 14, wherein the current longevity model is based at least on accelerated failure testing of the packaging technology, field failures of the packaging technology in the group of computer systems and telemetry data for the computer system and other computer systems in the group of computer systems.

18. The computer-program product of claim 17, wherein the accelerated failure testing of the packaging technology includes vibration and thermal testing.

19. The computer-program product of claim 14, wherein generating the service action involves comparing the longevity index values to one or more thresholds;

wherein, if the longevity index value is greater than a first threshold value in the one or more threshold values, the service action indicates that a probability of failure in the packaging technology in the computer system is low;

wherein, if the longevity index value is between the first threshold value and a second threshold value in the one or more threshold values, the service action indicates that a probability of failure in the packaging technology in the computer system is moderate; and wherein, if the longevity index value is less than the second threshold value, the service action indicates that a probability of failure in the packaging technology in the computer system is high.

20. A computer system, comprising:

a processor;

memory;

a program module, wherein the program module is stored in the memory and configured to be executed by the processor, the program module including instructions for generating a service action for the computer system, which is in a group of computer systems, the instructions including:

instructions for receiving telemetry data for the computer system that is collected during operation of the computer system, wherein the telemetry data includes thermal measurements and vibration level measurements in the computer system;

instructions for receiving a first longevity model that predicts longevity of a packaging technology used in the group of computer systems, wherein the first longevity model is based on vibration and thermal testing data for the packaging technology that was collected before the operation of the computer system;

instructions for determining a current longevity model for the packaging technology based on the first longevity model and the telemetry data;

instructions for using the current longevity model and the telemetry data to calculate a current longevity index value for the computer system, wherein the current longevity index value provides an estimate for the longevity of the packaging technology used in the computer system; and instructions for using the current longevity index value to cause the service action for the computer system to be generated.

21. The computer system of claim 20, wherein the current longevity model is based at least on accelerated failure testing of the packaging technology, field failures of the packaging technology in the group of computer systems and telemetry data for the computer system and other computer systems in the group of computer systems.

* * * * *

UNITED STATES PATENT AND TRADEMARK OFFICE
CERTIFICATE OF CORRECTION

PATENT NO.       : 8,798,944 B2
APPLICATION NO.  : 12/490012
DATED            : August 5, 2014
INVENTOR(S)      : Urmanov et al.

It is certified that error appears in the above-identified patent and that said Letters Patent is hereby corrected as shown below:

In the Specification

Column 7, line 52, delete "testing" and insert -- testing. --, therefor.

Signed and Sealed this
Third Day of March, 2015

Michelle K. Lee
*Deputy Director of the United States Patent and Trademark Office*